US012767860B2

(12) United States Patent
Kallman et al.

(10) Patent No.: US 12,767,860 B2
(45) Date of Patent: Oct. 20, 2026

(54) ADHESIVE ARTICLE WITH STRIPPABLE LINER

(71) Applicant: 3M INNOVATIVE PROPERTIES COMPANY, St. Paul, MN (US)

(72) Inventors: Guy M. Kallman, Woodbury, MN (US); Ignatius A. Kadoma, Cottage Grove, MN (US); Alexander J. Kugel, Woodbury, MN (US); Jayshree Seth, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1022 days.

(21) Appl. No.: 17/917,434

(22) PCT Filed: Apr. 13, 2021

(86) PCT No.: PCT/IB2021/053044

§ 371 (c)(1),
(2) Date: Oct. 6, 2022

(87) PCT Pub. No.: WO2021/209898

PCT Pub. Date: Oct. 21, 2021

(65) Prior Publication Data

US 2023/0151251 A1 May 18, 2023

Related U.S. Application Data

(60) Provisional application No. 63/010,161, filed on Apr. 15, 2020.

(51) Int. Cl.
*C09J 7/40* (2018.01)
*B32B 37/12* (2006.01)

(52) U.S. Cl.
CPC ............... *C09J 7/401* (2018.01); *C09J 7/403* (2018.01); *B32B 37/12* (2013.01);
(Continued)

(58) Field of Classification Search
CPC ...... C09J 7/401; C09J 7/403; C09J 2301/302; C09J 2427/006; C09J 2467/005; C09J 2467/006; C09J 2475/006; B32B 37/12
See application file for complete search history.

(56) References Cited

U.S. PATENT DOCUMENTS

| | | | | |
|---|---|---|---|---|
| 4,223,067 A | | 9/1980 | Levens | |
| 4,388,138 A | * | 6/1983 | Brown | B27N 3/083 156/289 |

(Continued)

FOREIGN PATENT DOCUMENTS

| | | | | |
|---|---|---|---|---|
| CA | 2891687 A1 | * | 5/2014 | C08K 3/26 |
| JP | 2004090324 A | | 3/2004 | |

(Continued)

OTHER PUBLICATIONS

International Search Report for PCT International Application No. PCT/IB2021/053044, mailed on Jul. 19, 2021, 3 pages.

*Primary Examiner* — Kevin R Kruer
(74) *Attorney, Agent, or Firm* — Jeffrey M. Olofson

(57) ABSTRACT

Adhesive articles with strippable liners are described. In particular, adhesive articles including an optional substrate having a first and second major surface, an adhesive layer provided on the first major surface of the substrate, and a strippable liner in contact with the adhesive layer including a polymer layer including polybutylene succinate and from about 0.5 and about 5 polymer weight percent of a plant-based wax are described. Liners from such articles may exhibit good release performance while being compostable.

16 Claims, 2 Drawing Sheets

(52) U.S. Cl.
CPC .... *C09J 2301/302* (2020.08); *C09J 2427/006* (2013.01); *C09J 2467/005* (2013.01); *C09J 2467/006* (2013.01); *C09J 2475/006* (2013.01)

(56) References Cited

U.S. PATENT DOCUMENTS

| | | | | |
|---|---|---|---|---|
| 5,602,221 | A | 2/1997 | Bennett et al. | |
| 6,103,152 | A | 8/2000 | Gehlsen et al. | |
| 6,440,566 | B1 * | 8/2002 | Maligie | B32B 27/36 427/508 |
| 2006/0078724 | A1 * | 4/2006 | Bhushan | B08B 17/06 428/323 |
| 2009/0054548 | A1 * | 2/2009 | Wang | C08L 3/08 604/364 |
| 2009/0196907 | A1 * | 8/2009 | Bunick | A61K 47/585 514/535 |
| 2009/0247036 | A1 * | 10/2009 | Shi | B32B 27/36 524/394 |
| 2009/0286031 | A1 * | 11/2009 | Shi | C09J 7/405 524/391 |
| 2010/0255240 | A1 * | 10/2010 | Beppu | B32B 15/08 526/348 |
| 2012/0016328 | A1 * | 1/2012 | Shi | B01J 20/28033 604/385.01 |
| 2012/0201990 | A1 | 8/2012 | Laprade | |
| 2013/0344324 | A1 * | 12/2013 | Yoshie | B32B 27/36 428/447 |
| 2017/0121568 | A1 | 5/2017 | Strebl | |
| 2019/0024010 | A1 * | 1/2019 | Blumenfeld | C10M 169/04 |
| 2020/0298698 | A1 | 9/2020 | Hayashi | |
| 2021/0045943 | A1 * | 2/2021 | Blasius | A61F 13/474 |
| 2021/0147673 | A1 * | 5/2021 | Yang | B32B 37/12 |
| 2025/0162303 | A1 * | 5/2025 | Heiskanen | B32B 37/06 |

FOREIGN PATENT DOCUMENTS

| | | | |
|---|---|---|---|
| JP | 7137500 | B2 | 9/2020 |
| KR | 20150092919 | A | 8/2015 |
| KR | 20160138668 | A | 12/2016 |
| WO | 1994023610 | A1 | 10/1994 |
| WO | 2019193468 | A1 | 10/2019 |
| WO | 2020217185 | A1 | 10/2020 |

* cited by examiner

ADHESIVE ARTICLE WITH STRIPPABLE LINER

BACKGROUND

Adhesives articles are useful, among other uses, to adhere a desired article to a substrate. Strippable liners are used to protect the adhesiveness of the adhesive itself. These liners can be stripped easy by a user before use.

SUMMARY

In one aspect, the present description relates to an adhesive article for a substrate. The adhesive article includes an adhesive layer attachable to a first major surface of the substrate, and a strippable liner in contact with the adhesive layer including a polymer layer including polybutylene succinate and from about 0.5 to about 5 polymer weight percent of a plant-based wax.

In another aspect, the present description relates to a method of forming an adhesive article. The method includes providing an adhesive layer attachable to a first major surface of a substrate, and laminating a liner including a polymer layer including polybutylene succinate and from about 0.5 to about 5 polymer weight percent of a plant-based wax to the adhesive layer.

In yet another aspect, the present description relates to a method of forming an adhesive article. The method includes providing a liner including a polymer layer including polybutylene succinate and from about 0.5 to about 5 polymer weight percent of a plant-based wax with an adhesive layer on a major surface of the liner, and laminating a substrate having a first and second major surface to the adhesive layer.

DETAILED DESCRIPTION

Figure 1:
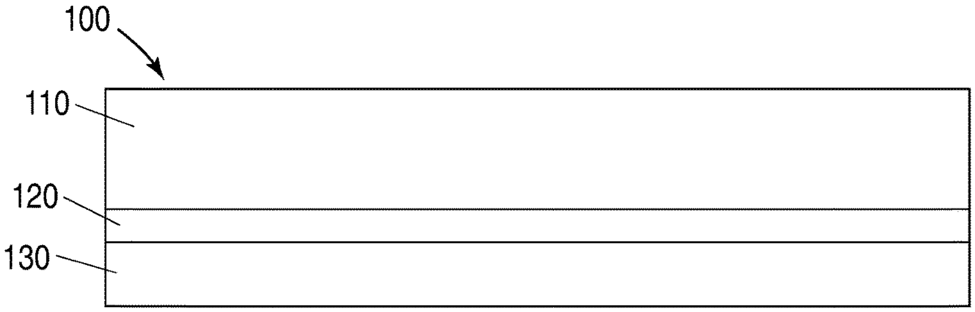
FIG. 1 is a side elevation schematic cross-section of an adhesive article.

FIG. 1 is a side elevation schematic cross-section of an adhesive article. Adhesive article 100 includes substrate 110, adhesive layer 120 attachable to substrate 110, and strippable liner 130. In some embodiments, substrate 110 is optional. In some embodiments, an adhesive article including adhesive layer 120 and strippable liner 130 without substrate 110 may provide a single-liner adhesive transfer tape. In some embodiments, the adhesive article may include one, two, or more of a substrate, an adhesive layer, and a strippable liner.

Adhesive article 100 adhesive article may include any suitable substrate. In some embodiments, the substrate may be or include a polymeric material. In some embodiments, substrate 110 may be another liner, which may provide a double-liner adhesive transfer tape. In some embodiments, substrate 110 may be a backing layer or a core, which may include a polymeric foam material, to provide a double-sided adhesive tape (see FIG. 5). Suitable polymeric materials include polyethylene terephthalate, high- or low-density polyethylene or polyesters generally, polycarbonate, polyvinyl chloride, polystyrene, polylactic acid, or cellulose acetate. Other suitable materials include paper or wood pulp materials, nonwoven or woven webs of natural or synthetic fibers. Suitable polymeric foam materials may include a polycarbonate, a polyacrylic, a polymethacrylic, an elastomer, a styrenic block copolymer, a styrene-isoprene-styrene (SIS), a styrene-ethylene/butylene-styrene block copolymer (SEBS), a polybutadiene, a polyisoprene, a polychloroprene, a random copolymer of styrene and diene styrene-butadiene rubber (SBR), a block copolymer of styrene and diene styrene-butadiene rubber (SBR), an ethylene-propylene-diene monomer rubber, a natural rubber, an ethylene propylene rubber, a polyethylene-terephthalate (PET), a polystyrene-polyethylene copolymer, a polyvinylcyclohexane, a polyacrylonitrile, a polyvinyl chloride, a polyurethane, an aromatic epoxy, an amorphous polyester, amorphous polyamides, a semicrystalline polyamide, an acrylonitrile-butadiene-styrene (ABS) copolymer, an ethylene-vinyl acetate (EVA), the copolymers of ethylene and vinyl acetate; also referred to as polyethylene-vinyl acetate (PEVA), a low-density polyethylene (LDPE), a polypropylene (PP), including expanded polypropylene (EPP) and polypropylene paper (PPP), a polystyrene (PS), including expanded polystyrene (EPS), extruded polystyrene (XPS) and sometimes polystyrene paper (PSP), a nitrile rubber (NBR) as in the copolymers of acrylonitrile (ACN) and butadiene, a polyphenylene oxide alloy, a high impact polystyrene, a polystyrene copolymer, a polymethylmethacrylate (PMMA), a fluorinated elastomer, a polydimethyl siloxane, a polyimide, a polyetherimide, an amorphous fluoropolymer, an amorphous polyolefin, a polyphenylene oxide, a polyphenylene oxide-polystyrene alloy, or mixtures thereof. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings Such treatments are typically selected based on the nature of the materials of the adhesive and of the foam or backing and include primers and surface modifications (e.g., corona treatment, surface abrasion). Additional foam tape constructions may include those described in U.S. Pat. No. 5,602,221 (Bennett et al.), U.S. Pat. No. 4,223,067 (Levens), and U.S. Pat. No. 6,103,152 (Gehlsen et al.), which are incorporated herein by reference. Substrate 110 may be substantially transparent, may have a high degree of diffusion (e.g., exhibit high haze and/or low clarity), or may include one or more pigments or colorants rendering it translucent or even opaque. Substrate 110 may be formed to be any suitable size or shape, through any appropriate process. In some embodiments, substrate 110 may be formed through a melt extrusion or a blown extrusion process. In some embodiments, substrate 110 may be formed through a calendaring process. In some embodiments, substrate 110 may be formed through a casting (e.g., a solvent casting) process. In some embodiments, substrate 110 may be formed from an additive manufacturing process.

Substrate 110 may have any suitable shape, size, and thickness. In some embodiments, where the adhesive article is tape- or film-like, substrate 110 may be from 10 micrometers to 3000 micrometers thick. In some embodiments, substrate 110 may be a portion of a larger material or surface. In some embodiments, substrate 110 may be several millimeters, centimeters, or even meters thick. For example, substrate 110 may be a portion of a floor, wall, or ceiling.

Truly, substrate 110 may be a portion of any object (vehicle, wall, box, electronic device), so long as, for example, the adhesive selected is able to adhere to the surface of the substrate.

Adhesive layer 120 may be any suitable material and may formed through any suitable process. In some embodiments, adhesive layer 120 includes an epoxy or an optically clear adhesive. In some embodiments, adhesive layer 120 is or includes a pressure sensitive adhesive layer. In some embodiments, adhesive layer 120 is or includes an acrylic pressure sensitive adhesive layer. In some embodiments, adhesive layer 120 is formed through a solvent coating process. In some embodiments, adhesive layer 120 is formed through an extrusion (melt- or blown-) process. Adhesive layer 120 may have any suitable thickness. Adhesive layer 120 may be selected for its rheological or optical properties. The adhesive layer may include a pigment, dye, or other colorant. In some embodiments, the adhesive may be between 10 and 1550 micrometers thick. In some embodiments, the adhesive may include partially embedded micro-beads, made from materials such as glass, ceramic, or polymeric resin or agglomerations thereof held together with a suitable binder material. In some embodiments, such microbeads may be index matched to the index of the adhesive layer.

In some embodiments, especially if the substrate does not inherently bond well to the adhesive chemistry, some embodiments may optionally include a prime layer on the substrate. The prime layer, also often called a primer or tie layer, may be any suitable substance or composition with any suitable thickness. The selection of the prime layer is to ensure sufficient adhesion (to prevent ply-bond failure) between the substrate and the adhesive layer, and to bond to both. In some embodiments, the prime layer may include a polyamide or a copolyamide. Certain materials may be alternatively or additionally useful as a barrier layer to prevent the migration of plasticizer, water, solvent, or other contaminants from the side of the substrate opposite the adhesive layer into the adhesive layer. Such a prime layer may be extremely thin: for example, less than 10 micrometers thick, less than 6 micrometers thick, less than 5 micrometers thick, less than 4 micrometers thick, less than 3 micrometers, thick, less than 2 micrometers thick, or even less than 1 micrometer thick. Such layers may be solvent cast, coated, or even extruded or coextruded (with one or more of the other layers).

Strippable liner 130 is disposed on adhesive layer 120 and is intended to protect the exposable (and adherable) side of the adhesive layer before it is attached to its ultimate surface. Accordingly, such a strippable liner is peelable and removable by a user at or near the time of installation. Note that installation may include laminating the adhesive article (without the strippable liner) to another film or film stack. Strippable liner 130 may be selected to be easily peelable, but also adapted to maintain contact with the adhesive layer until the time of removal. In some embodiments, the average peel force required to remove the liner from the adhesive is less than 700 g/in. In some embodiments, the average peel force required to remove the liner from the adhesive is less than 200 g/in. In some embodiments, the average peel force required to remove the liner from the adhesive is less than 100 g/in. In some embodiments, the average peel force required to remove the liner from the adhesive is less than 50 g/in. In some embodiments, the average peel force required to remove the liner from the adhesive is less than 30 g/in. In some embodiments, the average peel force required to remove the liner from the adhesive is less than 10 g/in. This peel force may not only be affected by the material, but also by any physical structure present on the adhesive-interfacing surface of the release liner (described in more detail in conjunction with FIG. 2, below), and also by environmental aging (e.g., prolonged exposure to temperature and humidity). The shockiness of the peel may also be an important parameter in some applications. A low variation in peel force corresponds to a smoother (less shocky) peel. In some embodiments, the root-mean-square deviation from the average peel force is less than 200 g/in. In some embodiments, the root-mean-square deviation from the average peel force is less than 100 On. In some embodiments, the root-mean-square deviation from the average peel force is less than 50 On. In some embodiments, the root-mean-square deviation from the average peel force is less than 20 g/in. In some embodiments, the root-mean-square deviation from the average peel force is less than 10 g/in. In some embodiments, the root-mean-square deviation from the average peel force is less than 5 On. In some embodiments, the root-mean-square deviation from the average peel force is less than 1 g/in.

Strippable liner may be formed from any suitable material. In some embodiments, strippable liner 130 includes polybutylene succinate. Polybutylene succinate is a biodegradable thermoplastic aliphatic polyester that decomposes naturally into water and carbon dioxide in the presence of microorganisms such as, for example, *Amycolatopsis* sp. HT-6 and *Penicillium* sp. Strain 14-3. PBS has a lower melting point (115° C.) than other biodegradable bioplastics such as polylactic acid (PLA), making it more easily extrudable. In some embodiments, the strippable liner may be compostable.

The term "compostable" refers to materials, compositions, or articles that meet the standard ASTM D6400 or ASTM D6868. It should be noted that those two standards are applicable to different types of materials, so the material, composition, or article need only meet one of them, usually whichever is most applicable, to be "compostable" as defined herein. Particularly, compostable materials, compositions, or articles will also meet the ASTMD5338 standard. Particularly, compostable materials, compositions, or articles will also meet one or more of the EN 12432, AS 4736, or ISO 17088 standards. More particularly, compostable materials, compositions, or articles will also meet the ISO 14855 standard. It should be noted that the term "compostable" as used herein is not interchangeable with the term "biodegradable." Something that is "compostable" must degrade within the time specified by the above standard or standards into materials having a toxicity, particularly plant toxicity, that conform with the above standard or standards. The term "biodegradable" does not specify the time in which a material must degrade nor does it specify that the compounds into which it degrades pass any standard for toxicity or lack of harm to the environment. For example, materials that meet the ASTM D6400 standard must pass the test specified in ISO 17088, which addresses "the presence of high levels of regulated metals and other harmful components," whereas a material that is "biodegradable" may have any level of harmful components.

In some embodiments, strippable liner 130 also includes between 0.5 and 5 polymer weight percent of wax. Suitable waxes include ethylene bis(stearamide) (EBS), castor wax, polyamitic acid, linoleic acid, arachidonic acid, polantolic acid, butyric acid, steric acid, and triglyceride. In some embodiments, the wax is a plant-based wax. Suitable plant-based waxes include castor wax, EBS, and soy wax.

Conventionally, silicone is commonly used to provide an easy-releasing liner material. Unfortunately, silicone is not easily recyclable in many commercial recycling streams. Even a thin layer on an otherwise recyclable material renders the entire liner unrecyclable. Many recyclable materials alone provide an unacceptably high (or shocky) peel. And, of course, silicone is not readily compostable either. Surprisingly, a combination of polybutylene succinate and a small amount of a wax (particularly a plant-based wax) can provide an acceptable or "premium" release performance while not requiring landfilling of the discarded liner.

Figure 2:
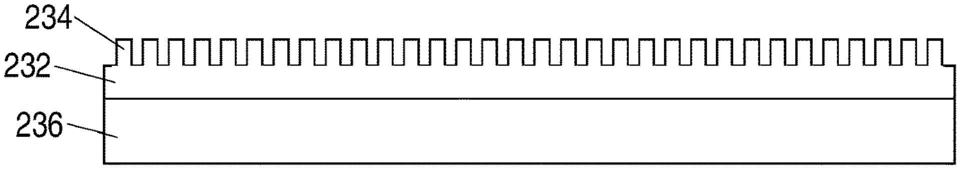
FIG. 2 is a side elevation schematic cross-section of a strippable liner.

FIG. 2 is a side elevation schematic cross-section of a strippable liner. Strippable liner includes release layer 232 including structured surface 234. Release layer 232 is optionally disposed on base layer 236.

FIG. 2 shows a structured strippable liner. Structured surface 234 disposed on one of the major surfaces of the strippable liner may include any suitable micro- or macro-structure. In some embodiments, structured surface 234 includes microstructures, which may be posts, prisms, raised rails, linear rail segments, or any other suitable shape. In some embodiments, at least one dimension of the structures is between 1 and 1000 micrometers. In some embodiments, structured surface 234 may include a pseudo-random or rough textured surface. In some embodiments, structured surface 234 may include beads.

Structured surface 234 may be formed from any suitable process, including additive manufacturing (e.g., 3D printing), negative manufacturing (e.g., etching), microreplication (e.g., continuous cast and cure), embossing, etc. In some embodiments, one or more of the shape, size, and relative positioning of the microstructures may vary across one or more directions of the strippable liner.

Structured surface 234 may significantly affect the peel force needed to strip the strippable liner. Because of the reduced surface area in contact with the adhesive (for at least certain structure shapes), the required peel force may be significantly reduced (on a per unit length basis).

Structured surfaces may have an alternative or additional benefit. Certain commercially available films include a structured adhesive, with microfeatures that can provide application features such as airbleed and slidability (e.g., IJ180Cv3 from 3M Company, with Comply™ and Controltac™ adhesive). In some cases, these structured features are formed by mating a structured liner to a substantially featureless adhesive layer. The features are embossed—and the adhesive receives a structured pattern that is the inverse of the structured liner. For example, in order to make channels in an adhesive layer, one would mate a structured liner having rails or ridges. However, this structured interface surface may provide even more contact surface area between the liner and the adhesive, and therefore the acceptability of the design may be even more reliant on the selection of the material. Certain selections of the shape and size of the structures—and the thickness and flowability of the adhesive—may help to prevent the adhesive fully wetting out the surface structure, thereby reducing the effect that closely mated structures may have on release. For example, in some embodiments, structures are shaped and sized such that the structure displaces more volume per unit area between the bearing surface and the planar land region than the adhesive volume for that same unit area.

Structured surface 234 is formed from or on release layer 232. Release layer 232 includes the materials described above in connection with strippable liner 130. In some embodiments, however, release layer 232 is formed on base layer 236. Because base layer 236 is not in contact with the adhesive layer, base layer 236 may be selected for properties other than its surface energy (i.e., its releasability from a particular adhesive layer). For example, base layer 236 may be or include polylactic acid or another bioplastic. In some embodiments, base layer 236 may be or include a polymeric material that is commercially recyclable. In some embodiments, base layer 236 may be or include a woven or nonwoven material formed from natural fibers. In some embodiments, base layer 236 may be or include a wood pulp or paper-like material.

Figure 3:
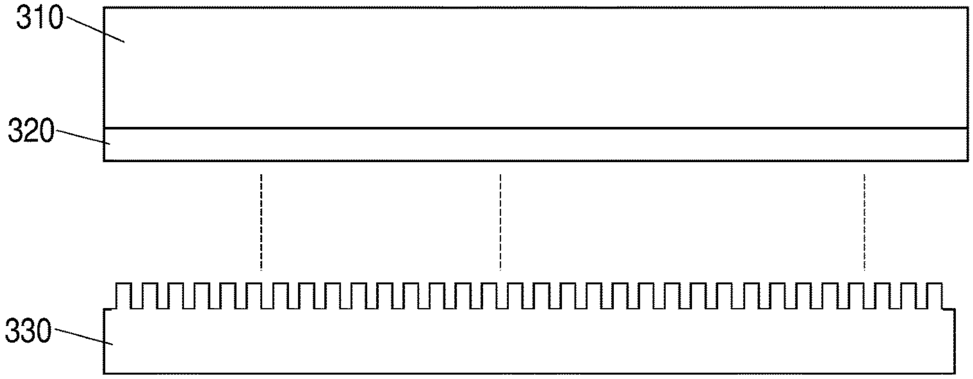
FIG. 3 is a side elevation schematic of a method of forming an adhesive article.

FIG. 3 is a side elevation schematic of a method of forming an adhesive article. Substrate 310 with adhesive layer 320 disposed on a major surface is laminated together with strippable liner 330. Such a lamination may be performed in a batch or as a continuous process.

Figure 4:
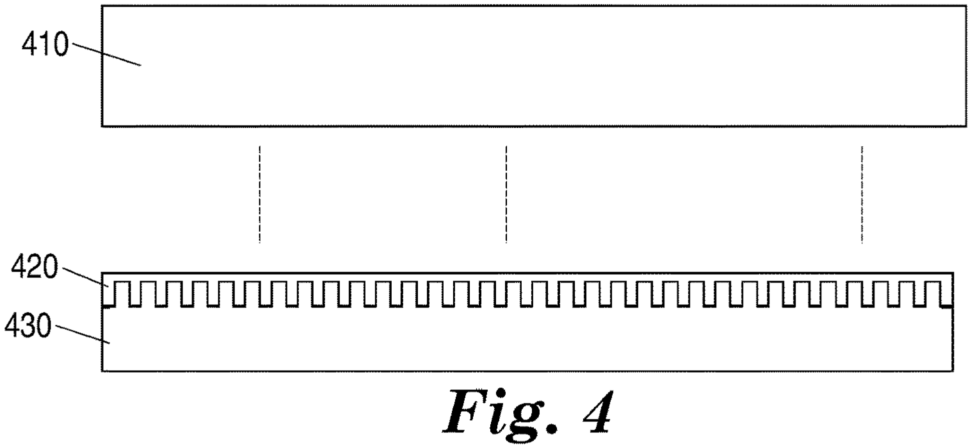
FIG. 4 is a side elevation schematic of another method of forming an adhesive article.

FIG. 4 is a side elevation schematic of another method of forming an adhesive article. Substrate 410 is laminated to strippable liner including adhesive layer 420 coated thereon. Like the process illustrated in FIG. 3, such a process may likewise be done in a batch process or in a continuous (roll-to-roll) process.

Figure 5:
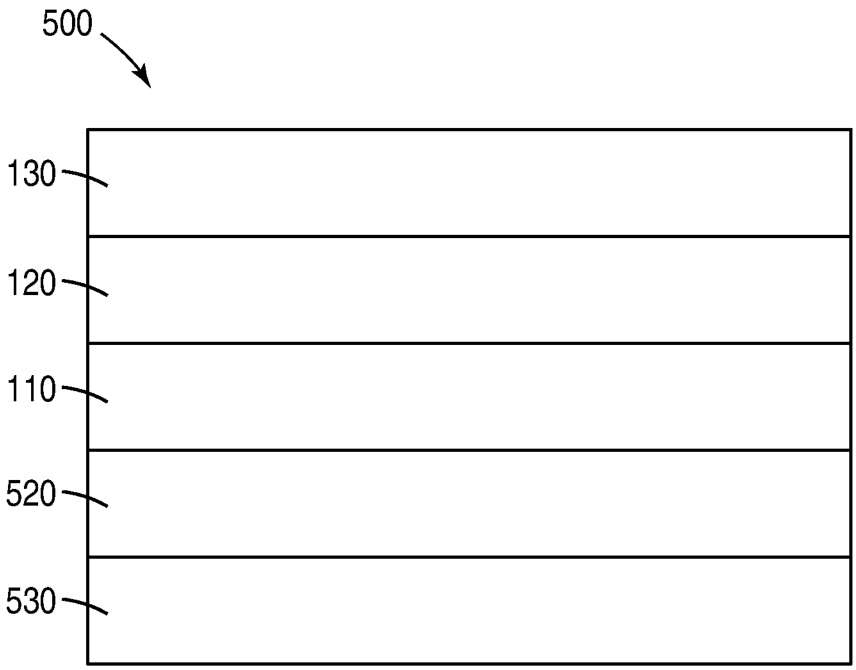
FIG. 5 is a side elevation schematic cross-section of a tape-type adhesive article.

FIG. 5 is a side elevation schematic cross-section of adhesive article 500 that is a tape including the strippable liner. As illustrated, adhesive article 500 includes substrate 110 (e.g., as a backing layer), first and second adhesive layers (adhesive layer 120 and adhesive layer 520), and first and second strippable liners (strippable liner 130 and strippable liner 530) to provide a double-sided adhesive tape with double liners. Second strippable liner 530 may be the same as or similar to strippable liner 130 in terms of material or construction.

Substrate 110 may have a first major surface and a second major surface on an opposite side of the substrate. Adhesive layer 120 and adhesive layer 520 may be positioned on opposite surfaces of the substrate 110. Adhesive layer 120 may be positioned in the first major surface. Adhesive layer 520 may be positioned on the second major surface. Strippable liner 130 may be positioned on adhesive layer 120 on the side opposite to substrate 110. Strippable liner 530 may be positioned on adhesive layer 520 on the side opposite to substrate 110.

One of first and second strippable liners 130, 530 may be optional. In some embodiments, adhesive article 500 includes only one of strippable liners 130, 530 to provide a double-sided adhesive tape with a single liner.

Any suitable adhesive article material or construction for a tape, including adhesive transfer tapes or double-sided tapes, may include one or more liners including strippable liner 130 or strippable liner 530, such as those materials and constructions described in WO 2019/193468, published Oct. 10, 2019, which is incorporated herein by reference in its entirety.

Descriptions for elements in figures should be understood to apply equally to corresponding elements in other figures, unless indicated otherwise. The present invention should not be considered limited to the particular embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

EXAMPLES

Adhesive articles were prepared. The physical and mechanical properties were evaluated as shown in the following examples. These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company, St. Louis, Missouri unless otherwise noted. The following abbreviations are used herein: gm=grams; kg=kilograms;

mm=millimeters; cm=centimeters; um=micrometers; in=inch; mL=milliliter; min=minute; sec=second; psi=pounds per square inch; RH=relative humidity; ° F.=degrees Fahrenheit; ° C.=degrees centigrade. The terms wt %, and % by weight were used interchangeably.

| Materials | |
|---|---|
| Abbreviation | Description |
| P1 | Bio-based polybutylene succinate pellets available from PTT MCC Biochem Co., Ltd., Bangkok, Thailand as BIOPBS-FZ71PB |
| W1 | Castor wax MP-80 available from Vertellus, Indianapolis, IN |
| V1 | Graphic Film, available from 3M Company, St. Paul, MN as 3M SCOTCHCAL Gloss Overlaminate 8518 |
| V2 | Graphic Film, available from 3M Company, St. Paul, MN as 3M SCOTCHCAL Translucent Graphic Film Series 3630-33 |
| V3 | 3M SCOTCH MAGIC Tape 810 available from 3M Company, St. Paul, MN |
| V4 | 3M SCOTCH Packaging Tape 3750 available from 3M Company, St. Paul, MN |
| V5 | 3M High Performance Masking Tape 232 available from 3M Company, St. Paul, MN |
| V6 | 3M SCOTCH Book Tape 845 available from 3M Company, St. Paul, MN |
| V7 | 3M 300LSE Low Surface Energy Bonding Tape available from 3M Company, St. Paul, MN |
| V8 | 3M 200MP Adhesive Transfer Tape available from 3M Company, St. Paul, MN |

Test Methods:
Release Peel Testing

In order to assess release peel force, a sample was prepared by first cutting it into a strip 1"×6" (2.5 cm×15.2 cm) in dimension. The functional side (non-adhesive) side of the strip was adhered to the moving platen of a slip peel testing apparatus (IMASS SP-2100) using two-sided tape. Once adhered, the release liner was peeled back just enough to secure in the transducer clip and setup for a 180° peel force evaluation. Test conditions used were: 180° peel, 90 in/min, 0.5 sec delay, 5 second average. After completion of the test the following properties were reported.

Average Peel Force (gm/in)=Average force to peel

Variation of Peel Force (gm/in)=The Root Mean Square (RMS) of variation from the average Re-Adhesion To confirm the performance of an adhesive surface after application, a sample was prepared by first cutting it into a strip 1"×6" (2.5 cm×15.2 cm) in dimension. A glass plate was fastened to the moving platen of a slip peel testing apparatus (IMASS SP-2100) using two-sided tape. After removing and discarding the release liner from the sample strip, it was applied to the glass surface using a 4.5 lb (2 kg) hand roller. Once adhered, the sample was peeled back just enough to secure in the transducer clip, setup for a 180° peel force evaluation. Test conditions used were: 180° peel, 90 in/min, 0.5 sec delay, 5 second average. After completion of the test the following properties were reported:

Average Peel Force (gm/in)=Average force to peel

Variation of Peel Force (gm/in)=The Root Mean Square (RMS) of variation from the average Liner Preparation:

Release liner (L1) was made by extruding 150-200 micrometers of 99% polybutylene succinate (P1)+1% W1 composition into a micro-replicated structured web. The micro-replicated structured web had an array of upstanding thermoplastic stems (posts) and was prepared in a manner similar to that described in PCT Publication No. WO 94/023610, ¶0038. The stem density was 286 stems/cm$^2$. The height of the stems was 250 μm and the width or diameter of the stems was 0.14 mm.

Release liner (L2) was made using the same process used for L1. Except that the micro-replicated web had been further processed as described in PCT Publication No. WO 94/023610¶0039. The stem had a cap diameter of 0.23 mm.

Example 1

Example 1 was prepared by first removing the adhesive release liner from V1, then hand laminating the overlaminate film to the structured side of L1. The resulting overlaminate (L1 attached as the new release liner) was then subjected to two forms of conditioning, first a portion of the material was held for 7 days at 50° C., while a second portion of the material was held at a constant temperature and humidity (CTH) of 25° C./50% humidity also for 7 days. After conditioning the samples were tested for Peel Release and Re-Adhesion. These are compared to a control in Table 1 below.

Example 2

Example 2 was prepared by first removing the adhesive release liner from V2, then hand laminating the translucent graphic film to the structured side of L1. The resulting graphic film (L1 attached as the new release liner) was then subjected to two forms of conditioning, first a portion of the material was held for 7 days at 150° F., while a second portion of the material was held at a constant temperature and humidity (CTH) of 25° C./50% humidity also for 7 days. After conditioning the samples were tested for Peel Release and Re-Adhesion.

Example 2 was also repeated with the application of the film V2 to the smooth side of L1. These are compared in Table 2 below.

Examples 3, 4, 5 & 6

For this study, four common 3M tapes were applied to both the textured and smooth side of L1 by hand application. Specifically, Example 3=V3 applied to L1 (smooth and textured sides)

Example 4=V4 applied to L1 (smooth and textured sides)

Example 5=V5 applied to L1 (smooth and textured sides)

Example 6=V6 applied to L1 (smooth and textured sides)

For each example, one portion of samples were aged for 3 days at 50° C., while a second portion was held at constant temperature and humidity (CTH) of 25° C./50% humidity for 3 days. After conditioning the samples were tested for Peel Release and Re-Adhesion.

These are compared in Table 3 below

Examples 7, 8, 9, 10

Four examples were prepared by hand laminating two different tapes to two different liner surfaces in order to evaluate peel mechanics. Specifically, Example 7=V7 applied to L1 Textured side Example 8=V7 applied to L2 Textured side Example 9=V8 applied to L1 Textured Side Example 10=V8 applied to L2 Textured Side For each example, one portion of samples were aged for 3 days at 50° C., while a second portion was held at constant temperature and humidity (CTH) of 25° C./50% humidity for 3 days. After conditioning the samples were tested for Peel Release and Re-Adhesion.

These are compared in Table 4 below.

Comparative Example 1

Comparative Example 1 (CE1)=V1

TABLE 1

| Example | Peel Release after 7 days at CTH (g/in) | Peel Release after 7 days at 50 C. (g/in) | Re-Adhesion after 7 days at CTH (g/in) | Re-Adhesion after 7 days at 50 C. (g/in) |
|---|---|---|---|---|
| Example 1 | Average = 60.7<br>RMS = 5.4 | Average = 44.8<br>RMS = 8.4 | Average = 2129.0<br>RMS = 25.5 | Average = 2200<br>RMS = 20 |
| CE1 | Average = 54.9<br>RMS = 2.6 | Average = 42.3<br>RMS = 2.4 | Average = 2112.0<br>RMS = 68 | Average = 2120.5<br>RMS = 19.8 |

TABLE 2

| Example | Peel Release after 7 days at CTH (g/in) | Peel Release after 7 days at 150 F. (g/in) |
|---|---|---|
| Example 2 "Textured Side" | Average = 25.3<br>RMS = 2.7 | Average = 18.9<br>RMS = 2.3 |
| Example 2 "Smooth Side" | Average = 99.6<br>RMS = 25.4 | Average = 723.3<br>RMS = 167.2 |

TABLE 3

| Example | Peel Release after 3 days at CTH (g/in) | Peel Release after 3 days at 50 C. (g/in) | Re-Adhesion after 3 days at CTH (g/in) | Re-Adhesion after 3 days at 50 C. (g/in) |
|---|---|---|---|---|
| Example 3 "Textured Side" | Average = 7.1 | Average = 5.4 | Average = 470.6 | Average = 351.5 |
| Example 3 "Smooth Side" | Average = 194.5 | Average = 108.6 | Average = 396.9 | Average = 445.1 |
| Example 4 "Textured Side" | Average = 40.0 | Average = 36.9 | Average = 1672.6 | Average = 1479.8 |
| Example 4 "Smooth Side" | Average = 458.9 | Average = 256.9 | Average = 1403.3 | NR* |
| Example 5 "Textured Side" | Average = 115.8 | Average = 120.2 | Average = 1221.9 | Average = 1187.8 |
| Example 5 "Smooth Side" | Average = 634.4 | Average = 560.1 | Average = 895.8 | NR* |
| Example 6 "Textured Side" | Average = 24.3 | Average = 25.7 | Average = 1012.1 | Average = 935.5 |
| Example 6 "Smooth Side" | Average = 348.1 | Average = 285.8 | Average = 646.4 | 567 |

*Sample Contaminated, no usable data obtained

TABLE 4

| Example | Peel Release after 3 days at CTH (g/in) | Peel Release after 3 days at 50 C. (g/in) | Re-Adhesion after 3 days at CTH (g/in) | Re-Adhesion after 3 days at 50 C. (g/in) |
|---|---|---|---|---|
| Example 7 | Average = 28.3 | Average = 57.6 | Average = 671.9 | Average = 830.6 |
| Example 8 | Average = 64.5 | Average = 83.4 | Average = 1417.5 | Average = 601 |
| Example 9 | Average = 20.8 | Average = 18.4 | Average = 201.3 | Average = 2440.9 |
| Example 10 | Average = 36.0 | Average = 32.9 | Average = 3107.1 | Average = 2171.6 |

What is claimed is:

1. An adhesive article for a substrate, comprising:

an adhesive layer attachable to a first major surface of the substrate; and a strippable liner in contact with the adhesive layer including a polymer layer including polybutylene succinate and from about 0.5 to about 5 polymer weight percent of a plant-based wax, wherein the surface of the strippable liner in contact with the adhesive layer includes microstructures in the form of posts, prisms, raised rails, or raised linear rail segments and wherein the strippable liner is peelable from the adhesive layer with a Peel Force of less than 100 grams/inch.

2. The adhesive article of claim 1, wherein the adhesive is a pressure sensitive adhesive.

3. The adhesive article of claim 1, further comprising the substrate, wherein the substrate includes a primer layer as the first major surface.

4. The adhesive article of claim 1, further comprising the substrate, wherein the substrate includes polyvinyl chloride or polyurethane.

5. The adhesive article of claim 1, further comprising the substrate, wherein the substrate includes a bioplastic.

6. The adhesive article of claim 1, wherein the strippable liner or the substrate includes polylactic acid.

7. The adhesive article of claim 1, wherein the plant-based wax is castor wax.

8. The adhesive article of claim 1, further comprising the substrate and an ink layer on a second major surface of the substrate.

9. The adhesive article of claim 1, wherein the polymer layer of the strippable liner includes at least 95 polymer weight percent of polybutylene succinate.

10. The adhesive article of claim 1, wherein the strippable liner includes no other layers besides the polymer layer.

11. The adhesive article of claim 1, wherein the strippable liner further includes a paper layer, disposed such that the polymer layer is in contact with both the adhesive and the paper layer.

12. The adhesive article of claim 1, wherein the strippable liner further includes a base polymer layer, disposed such that the polymer layer is in contact with both the adhesive and the base polymer layer.

13. The adhesive article of claim 1, wherein the adhesive article is a tape.

14. The adhesive article of claim 13, wherein the tape is an adhesive transfer tape.

15. A method of forming an adhesive article, comprising:

providing an adhesive layer attachable to a first major surface of a substrate; and laminating a liner including a polymer layer including polybutylene succinate and from about 0.5 to about 5 polymer weight percent of a plant-based wax to the adhesive layer, wherein the surface of the liner laminated to the adhesive layer includes microstructures in the form of posts, prisms, raised rails, or raised linear rail segments and wherein the strippable liner is peelable from the adhesive layer with a Peel Force of less than 100 grams/inch.

16. A method of forming an adhesive article, comprising:

providing a liner including a polymer layer including polybutylene succinate and from about 0.5 to about 5 polymer weight percent of a plant-based wax with an adhesive layer on a major surface of the liner; and laminating a substrate having a first and second major surface to the adhesive layer, wherein the surface of the liner in contact with the adhesive layer includes microstructures in the form of posts, prisms, raised rails, or raised linear rail segments and wherein the strippable liner is peelable from the adhesive layer with a Peel Force of less than 100 grams/inch.

* * * * *